United States Patent [19]

Reboulet

[11] Patent Number: 5,539,291
[45] Date of Patent: Jul. 23, 1996

[54] PARALLEL-STRUCTURE MANIPULATOR DEVICE FOR DISPLACING AND ORIENTING AN OBJECT IN A CYLINDRICAL WORK SPACE

[75] Inventor: Claude Reboulet, Labege, France

[73] Assignee: Office National d'Etudes et de Recherches Aerospatiales, Chatillon Sous Bagneux, France

[21] Appl. No.: 391,676

[22] Filed: Feb. 21, 1995

[30] Foreign Application Priority Data

Feb. 22, 1994 [FR] France ................................. 94 01979

[51] Int. Cl.⁶ ........................................................ B25J 9/00
[52] U.S. Cl. ...................................... 318/568.11; 414/733
[58] Field of Search ............................. 318/567–568.25, 318/575; 901/17; 414/730–733

[56] References Cited

U.S. PATENT DOCUMENTS

| | | |
|---|---|---|
| 2,286,571 | 6/1942 | Pollard . |
| 4,174,999 | 11/1979 | Burns ..................................... 176/19 R |
| 4,806,068 | 2/1989 | Kohli et al. ............................... 901/17 |
| 4,904,152 | 2/1990 | Doi et al. ................................. 318/594 |
| 5,219,266 | 6/1993 | Reboulet et al. . |

FOREIGN PATENT DOCUMENTS

| | | |
|---|---|---|
| 0084249 | 7/1983 | European Pat. Off. . |
| 0200105 | 11/1986 | European Pat. Off. . |
| 0232930 | 8/1987 | European Pat. Off. . |
| 2819976 | 11/1979 | Germany . |
| 2120635 | 12/1983 | United Kingdom . |

*Primary Examiner*—Brian Sireus
*Attorney, Agent, or Firm*—Larson & Taylor

[57] ABSTRACT

A parallel structure manipulator device for displacing an object in a cylindrical work space about a predetermined axis (X) includes at least three drive mechanisms (A, B, C) interposed between a base (2) and a moving element (1). Two of the mechanisms (A, B) each include: mover (V) movable along a circular path (L) in a transverse plane perpendicular to the axis (X); a connecting rod (7) extending between the mover and the element (1) and connected thereto by a hinge (8) capable of two-directional rotation; and an attitude transmission member (9) associated with the connecting rod for maintaining the element (1) parallel to the transverse plane. The mechanisms (A, B) act together on the element (1) to define its angular position about the axis (X) and its distance (D) from a notional axis (W) passing through those ends of the connecting rods that are connected to the mover. A third mechanism (C) is free to rotate relative to the base about an axis parallel to the axis (X) and away from the transverse plane. The third mechanism is supported by the base about a pivot axis (H) perpendicular to the axis (X). The third mechanism is thus functionally active to adjust the distance between the element (1) and the pivot axis (H), and to maintain the element (1) pointing towards the axis (X).

8 Claims, 3 Drawing Sheets

PARALLEL-STRUCTURE MANIPULATOR DEVICE FOR DISPLACING AND ORIENTING AN OBJECT IN A CYLINDRICAL WORK SPACE

FIELD OF THE INVENTION

The present invention relates to a parallel structure manipulator device enabling an object to be displaced and oriented in a cylindrical work space about a predetermined axis, said device comprising a base, a moving element constituting said object or having said object connected thereto, and three drive mechanisms each interposed between the base and the moving element.

By way of non-limiting example, a manipulator device of the invention may be used for manipulating cassettes containing magnetic tapes, analog or digital disks, etc., in a computer library having a cylindrical (circular or otherwise) wall provided with slots for storing said cassettes.

BACKGROUND OF THE INVENTION

The particular shape of the space in which the manipulator device is to move makes it possible to envisage a special structure capable of displacing an object while maintaining a radial orientation therefor which is considerably simpler than the structure of known manipulator devices (e.g. from document FR-A-2 670 424 or U.S. Pat. No. 5,219,266) which are designed to move an object parallel to itself.

SUMMARY OF THE INVENTION

To this end, a manipulator device of the above-specified type is essentially characterized, when implemented according to the invention, with a first and a second drive mechanism. Each drive mechanism includes a mover means which is movable in a transverse plane substantially perpendicular to the predetermined axis along a curved path centered on an axis substantially parallel to the predetermined axis. A connecting rod is interposed between the mover means and the moving element, which connecting rod is connected thereto at respective ends thereof via hinge means capable of two-directional rotation. An attitude transmission member is functionally associated with the connecting rod in such a manner that any displacement of the connecting rod is accompanied by the moving element being kept parallel to the plane extending transversely to the predetermined axis.

With this construction, the drive mechanisms are suitable for operating together on the moving element to define its angular position about the predetermined axis and also its distance relative to a notional axis passing through the two connecting rod ends that are connected to the respective mover means.

The manipulator device also includes a third drive mechanism mounted on the base so as to be free to rotate about an axis that is substantially parallel to the predetermined axis and away from the above-mentioned plane extending transversely to the predetermined axis. This third drive mechanism is supported by the base on a pivot axis substantially perpendicular to the above-mentioned predetermined axis, being functionally active to adjust the distance between the moving element and the pivot axis and to maintain the radial orientation of the moving element relative to the predetermined axis.

With this construction the position and the orientation of the object depend on the positions of the three above-mentioned mechanisms.

Compared with known other manipulator devices, the manipulator device of the present invention thus has the essential advantage that three, and only three, drive mechanisms are suitable not only for displacing the object, but also for orienting the object in a cylindrical work space.

To obtain a structure that is simpler and to obtain high operating speed, it is desirable to provide for each mover means to comprise a substantially radial arm suitable for pivoting under the action of motor means on the base about an axis substantially parallel to said predetermined axis.

Similarly, it is desirable to ensure that the third drive mechanism comprises an arm extending approximately in a plane defined by the above-mentioned axes and supported by the base so as to be free to rotate about an axis substantially parallel to the above-mentioned predetermined axis. This arm is suitable for pivoting under the action of mover means in the above-mentioned plane relative to the base about an axis substantially perpendicular to the predetermined axis. A connecting rod is interposed between the free end of the arm and the moving element, the connecting rod being connected thereto so as to be free to rotate by means of respective pins that are substantially parallel to each other and substantially perpendicular to the predetermined axis.

In order also to simplify the control of the drive mechanisms and to provide a device capable of covering an angular field of 360°, provision is made for the first and second drive mechanisms to be pivotally mounted on the base to pivot about a common axis which coincides with the predetermined axis, and for the third drive mechanism to be mounted on the base so as to be free to rotate about the predetermined axis. Still for the purpose of simplifying controls, it is advantageous for the moving mover means of the first and second drive means respectively to have their displacements synchronized so that they are displaced simultaneously in the same direction or in opposite directions over equal angular distances.

In a preferred embodiment, the hinge means and the attitude transmission member of each of said first and second drive mechanisms are structurally combined and comprise firstly two wheels connected to respective opposite ends of the connecting rod about axes that are transverse to the rod and to the predetermined axis, and that are connected respectively to the arm and to the moving element by diametrically-extending shafts, and secondly a flexible link wound without slip on said wheels. It is then advantageous, in order to obtain a structure that is simple but reliable, for the flexible link to be a cable secured to both wheels.

If the cylindrical space is very tall, exceeding the capacity of the drive mechanisms for axial travel, said capacity can be increased by providing for the base to be organized so as to be capable of being displaced linearly parallel to the predetermined axis.

Because of the dispositions of the invention, the moving element possesses three degree of freedom which are similar to those of a conventional cylindrical type robot, but making use of a parallel structure control mechanism which secures very high displacement and positioning speed.

In addition, unlike a structure having a serial type mechanism (in which the $n^{th}$ motor is carried by the $(n-1)^{th}$ arm, itself driven by the $(n-1)^{th}$ motor, etc.) which leads to elements being over-dimensioned and to high inertias that give rise to smaller displacement speeds, the parallel structure device of the invention makes it possible to obtain the same stiffness with moving members that are lighter in weight and that have much lower inertia.

Consequently, the speed performance of a parallel type device implemented in accordance with the invention is much greater than that which can be provided by a conventional serial type robot.

BRIEF DESCRIPTION OF THE DRAWINGS

The invention will be better understood on reading the following detailed description of a preferred embodiment given solely by way of purely illustrative example. In the description, reference is made to the accompanying drawings, in which:

FIGS. 1 and 2 show only that portion of the manipulator device that comes within the ambit of the invention, and in particular neither the control means for causing the device to operate, nor the boundary defining the cylindrical space in which the device works are shown. The cylindrical space is represented merely by its central axis and/or axis of symmetry X.

DESCRIPTION OF THE PREFERRED EMBODIMENTS

Figure 1:
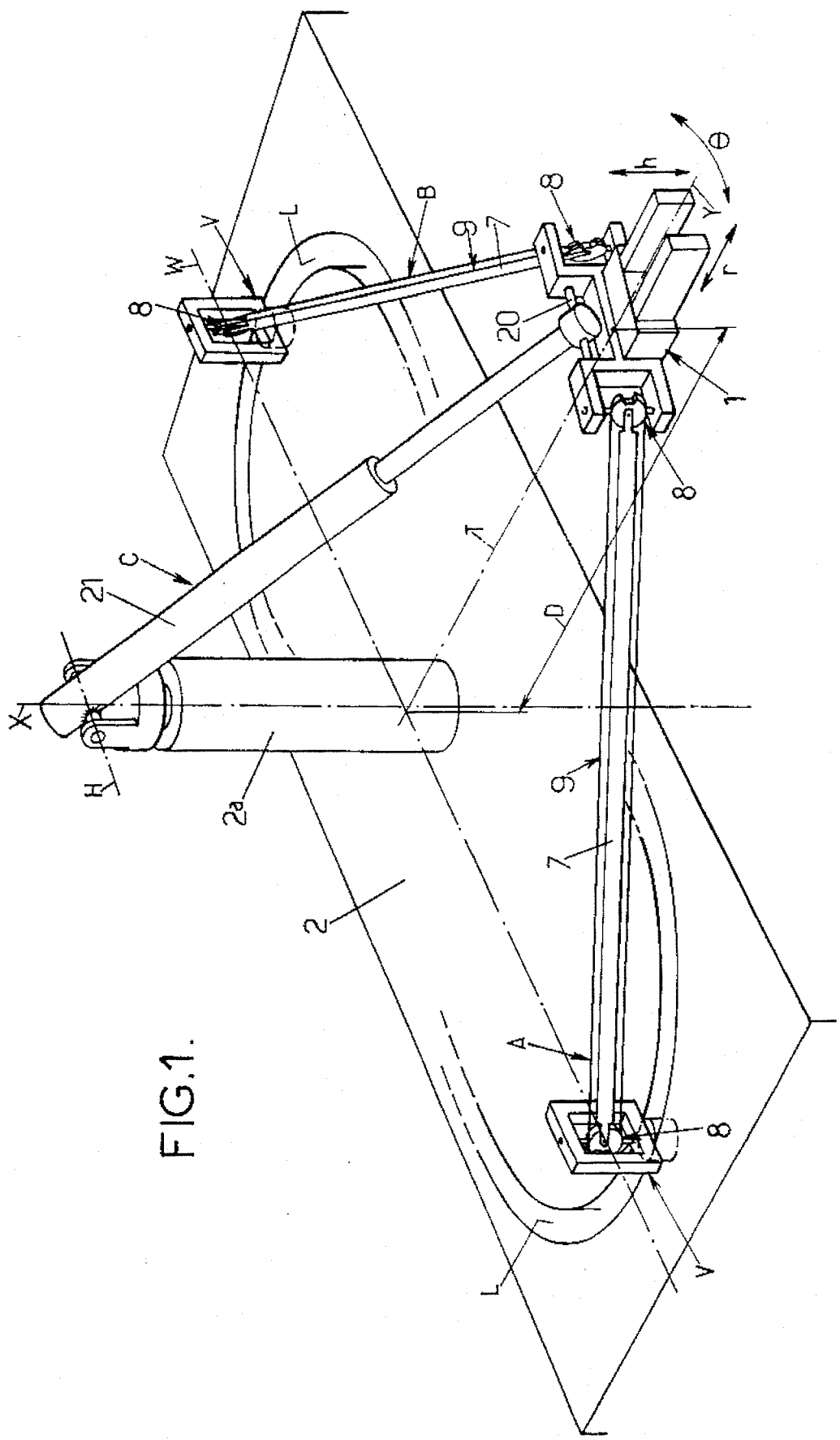
FIG. 1 is a highly diagrammatic side view in perspective showing the principles on which a parallel structure manipulator device of the invention is embodied.

With reference initially to FIG. 1, the parallel structure manipulator device is specifically designed to displace an object in a cylindrical space about a predetermined axis X in such a manner that the object remains parallel to a given transverse plane that is perpendicular to the axis X, and that simultaneously a privileged axis Y of the object continues to point permanently towards the axis X; in other words, the manipulator device of the invention makes it possible simultaneously to displace and to orient the object in a cylindrical space. The device comprises a base 2, a moving element 1 which may constitute the object itself or which may be connected to said object (for example, in this case the moving element 1 is shown diagrammatically in the form of a grasping clamp), and three drive mechanisms A, B, and C each interposed between the base 2 and the moving element 1.

The first and second drive mechanisms A and B may be identical and they extend between the base 2 and the moving element 1.

Each drive mechanism A and B essentially comprises:

mover means V, with a particular embodiment thereof being described below, movable in a stationary transverse plane that is substantially perpendicular to the axis X (which plane may be embodied by the base 2), over a curved path L centered on an axis that is substantially parallel to the axis X;

a connecting rod 7 interposed between the mover means V and the moving element 1 and connected thereto at its respective ends by hinge means 8 capable of two-directional rotation; and an attitude transmission member 9 functionally associated with the connecting rod 7 so that any displacement of the connecting rod 7 is accompanied by the moving element 1 being held parallel to the plane that extends transversely to the axis X.

With the drive mechanisms A and B organized in this way, any angular displacement of one and/or the other mover means V acts, via the respective one and/or other connecting rod 7 to move the moving element, which movement can be resolved into rotation about the axis X (degree of freedom θ) and/or radial linear displacement along the axis T running from the moving element 1 to the axis X (degree of freedom r). The moving element 1 nevertheless remains free to rotate together with the connecting rods 7 on the hinges 8 connecting said connecting rods 7 to the mover means V, i.e. it can rotate in the plane defined by the axes X and T about a notional axis W passing through both mover means V.

The two drive mechanisms A and B are therefore suitable for acting on the moving element 1 so as to define its angular position about the axis X (degree of freedom θ) and its distance D from the notional axis W (degree of freedom r).

To simplify the control of the mover means V, it is desirable for the displacements of the two mover means V to be synchronized so that they move simultaneously through equal angular amplitudes, either in the same direction or else in opposite directions. Under such conditions, moving them simultaneously in the same direction causes the axis T to rotate about the axis X (with the distance D remaining constant), while moving them simultaneously in opposite directions give rise to a decrease or an increase in the distance D along the axis T which itself remains fixed.

Figure 2:
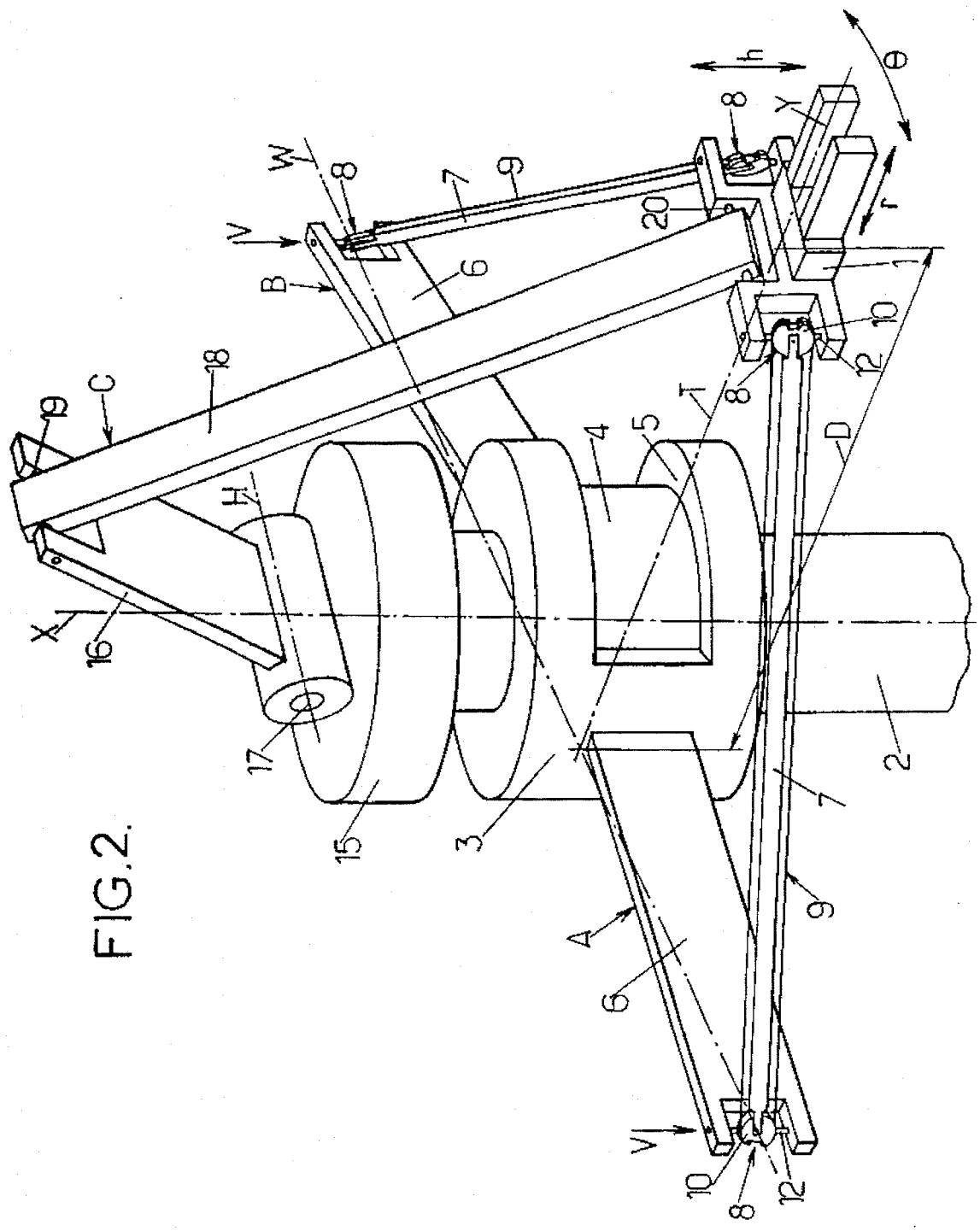
FIG. 2 is a diagrammatic side view in perspective of a preferred embodiment of a parallel structure manipulator device in accordance with the invention.

Also for the purpose of simplifying the control of the mover means V and for allowing the device to move over an angular field of 360° C., it is desirable for the curved paths of said mover means V to be coaxial about the axis X and to have the same radius (as shown in the disposition of FIG. 2).

In the preferred embodiment, as shown in FIG. 2, the first and second drive mechanisms A and B comprise respective drums 3 and 4 coaxial with the axis X and supported by the base 2 which is implemented in the form of a circularly cylindrical pillar. The two drums are associated with respective mover means (not shown) enabling them to be rotated about the axis X independently of each other. To make the assembly more compact, provision may be made for the drums to be nested one in the other. The outer drum 3 has a circumferentially-extending slot 5 revealing a portion of the inner drum 4 to allow the radial arm 6 carried by the inner drum to pass freely therethrough.

Otherwise, the first and second drive mechanisms A and B are made up of identical members. Each of the mover means V comprises one of the above-mentioned drums 3, 4 and a substantially radial arm 6 carried by the corresponding drum 3, 4, the arm of the inner drum 4 passing through the slot 5 in the outer drum 3 so that both arms are situated in substantially the same plane. The corresponding connecting rod 7 is interposed between the free end of each arm 6 and the moving element 1, each connecting rod 7 being connected thereto at respective ends via the hinge means 8 that confer freedom of movement in three dimensions thereto.

Naturally, it is also possible to envisage other equivalent dispositions, for example using two superposed drums and an offset on at least one of the arms so that both arms lie in substantially the same plane.

Figure 3:
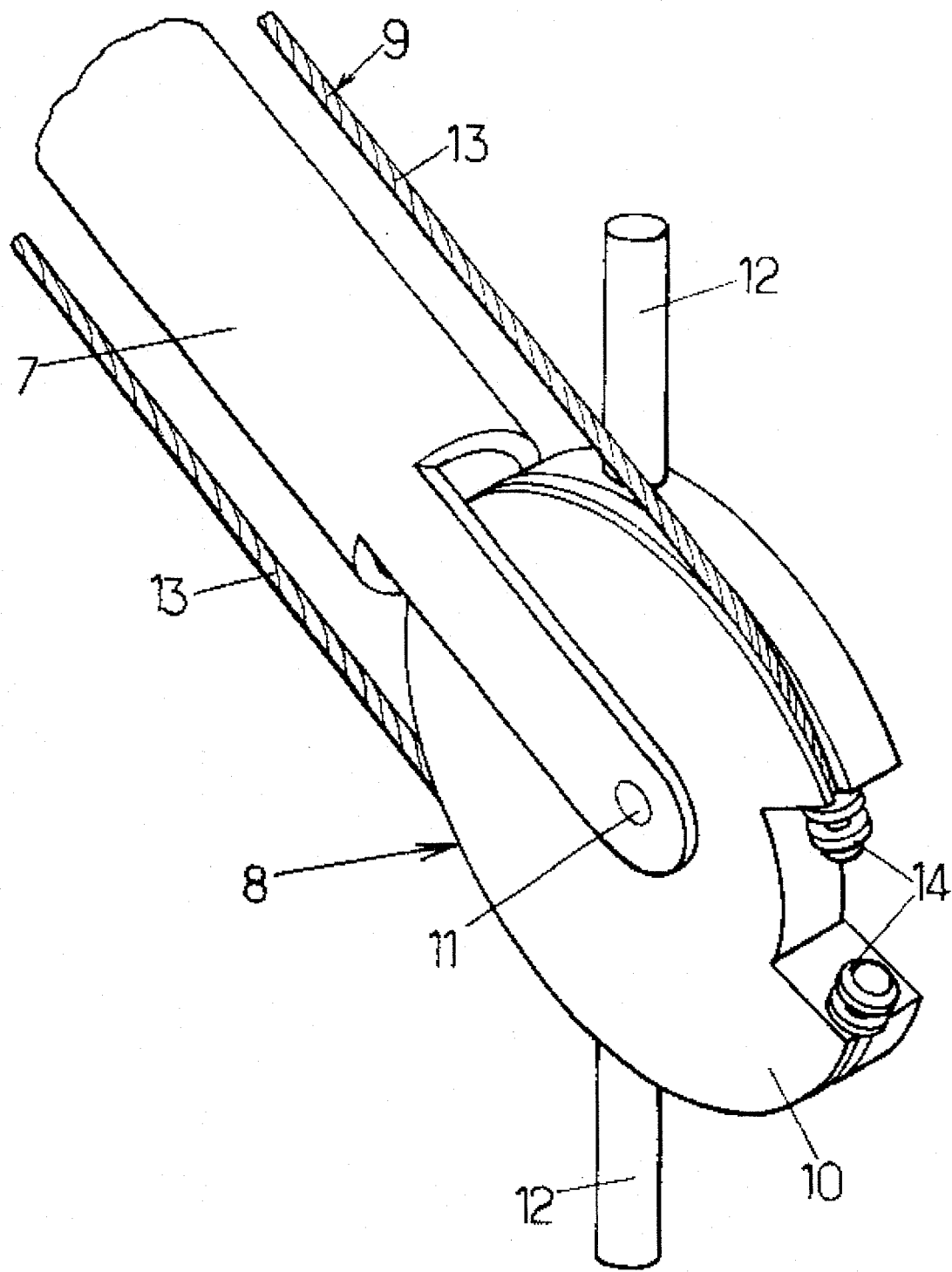
FIG. 3 is a diagrammatic perspective view showing a detail of the device of FIG. 1 or 2.

The hinge means 8 and the attitude-transmission member 9 may be functionally and structurally combined and may be constituted in the manner described below which is visible more clearly and on a larger scale in FIG. 3. At each of its ends, a connecting rod 7 has a wheel 10 mounted on an axis 11 extending transversely to the connecting rod and to the axis X, and in addition the wheel 10 carries a diametrically-extending shaft 12 that is substantially parallel to the axis X, which shaft is in turn connected to the arm 6 or to the moving element 1 as the case may be to form a universal joint type hinge so that the connecting rod can slope in a direction parallel to the axis X relative to the arm 6 and so that the connecting rod can swing transversely to the axis X. Finally, a flexible link 13 winds without slip over each of the two wheels 10 and is tensioned parallel to the connecting rod 7 so as to ensure that the relative angular position between the connecting rod 7 and the arm 6 is transmitted from one of the wheels to the other, thereby maintaining the moving element 1 continuously parallel to a plane extending transversely to the axis, regardless of the displacements or positions of the connecting rods 7. The flexible link 13 may be a cog belt or a cable. In the accompanying drawings, it is constituted by two parallel lengths of cable disposed on opposite sides of the connecting rod 7, which lengths of cable are secured to the wheels 10 by fastening and tension-adjusting means 14.

The third drive mechanism C is organized to support the moving element 1 while freely tracking the movements imparted to the moving element 1 by the mechanisms A and B, and also to control the third degree of freedom of the moving element 1, i.e. rotation about above-mentioned axis W, and thus its position above or below the plane in which the mover means V move.

As shown in FIG. 1, the drive mechanism C is mounted on the base 2 so as to be freely rotatable about an axis substantially parallel to the axis X and it is situated away from the plane in which the mover means V move. To this end, the base 2 has a projecting portion 2a (e.g. in the form of a pillar) on which the drive mechanism C is mounted so as to be free to rotate. In addition, the drive mechanism C is supported by the projecting portion 2a on the base 2 about a pivot axis H that is substantially perpendicular to the axis X, and it is functionally active to adjust the distance between the moving element 1 and said pivot axis H so as to control the third degree of freedom h of the moving element 1. In FIG. 1, the mechanism C is represented as being a telescopic arm 21 (a pneumatic or hydraulic piston, a rack mechanism) of variable length under the control of means that are not shown, the telescopic arm 21 being freely pivoted about the axis H.

Still for the purpose of simplifying the controls, the axis of rotation of the third mechanism C relative to the base 2 preferably coincides with the axis X.

In the preferred embodiment shown in FIG. 2, the drive mechanism C comprises a drum 15 that is free to rotate relative to the base 2 (e.g. being supported at the end thereof) and that is coaxial with the axis X. An arm 16 is supported by the drum 15 so as to be capable of rotating under the action of drive means (not shown) about the axis H which is substantially perpendicular to the axis X. A connecting rod 18 extends between the free end of the arm 16 and the moving elements 1.

Finally, the third mechanism C also has the function of controlling the third degree of freedom concerning the attitude of the moving element 1 and of ensuring that its privileged axis Y remains constantly directed towards the axis X (in a radial position colinear with the axis T in the event of a circularly cylindrical space as shown in FIGS. 1 and 2). For this purpose, the connecting rod 18 is connected so as to be free to rotate relative to the moving element 1 about an axis 20 that is substantially perpendicular to the axis X. In the embodiment of FIG. 2, the connecting rod 18 is also connected so as to be free to rotate at the end of the arm 16 about an axis 19 which is parallel to the axis 20 and perpendicular to the axis X.

Organized in this way, the drive mechanism C extends in a plane defined by the axes X and Y and pivots about the axis X.

The position and the orientation of the moving element 1 depend on the positions of the three mechanisms A, B, and C, which positions correspond to the positions given to the three respective control motors. The combined actions of the first two mechanisms A and B fix the position of the plane defined by the axes X and T, with the moving element 1 retaining the possibility of rotating about the axis W in that plane, and they also fix the moving element in an attitude that is parallel to the plane extending transversely to the axis X. Consequently, the position of the element 1 about the axis X and the orientation of the privileged axis Y about the axis X are still free and cannot be imposed by the first two mechanisms A and B. The presence of the third mechanism C serves to fix these two movements that are still free.

The manipulator device of the invention thus makes it possible, with appropriate control being applied to each of the three motors, to control three movements of the element 1, namely:

its angular position θ about the axis X;

its radial distance r from the axis X; and its position h parallel to the axis X.

With respect to the third parameter, it is possible to further increase the amplitude of movement available to the element 1 parallel to the axis X by giving the base 2 the possibility of moving parallel to the axis X.

Naturally, and as can be seen from the description above, the invention is not limited in any way to the applications and embodiments mentioned more particularly; on the contrary, it covers all variants.

In particular, although the device of the invention is described above with reference to a cylindrical work space, and indeed a circularly cylindrical work space, which appears to be the commonest application, it will be understood that the same device is also capable of operating in a space possessing an axis of symmetry but not strictly cylindrical in the geometrical meaning of the term, e.g. a space that is conical or pyramid-shaped.

I claim:

1. A parallel structure manipulator device enabling an object to be displaced and oriented in acylindrical work space about a predetermined axis (X), said device comprising a base (2), a moving element (1) constituting said object or having said object connected thereto, and three drive mechanisms (A, B, C) each interposed between the base (2) and the moving element (1), characterized in that:

each of a first and a second drive mechanism (A, B) comprises:

a mover means (V) which is movable in a transverse plane substantially perpendicular to the predetermined axis (X) along a curved path (L) centered on an axis substantially parallel to the predetermined axis (X);

a connecting rod (7) interposed between the mover means and the moving element (1) and connected thereto at respective ends via hinge means (8) capable of two-directional rotation; and an attitude transmission member (9) functionally associated with said connecting rod (7) in such a manner that any displacement of the connecting rod is accompanied by the moving element being kept parallel to the plane extending transversely to said predetermined axis (X);

wherein said drive mechanisms (A, B) operate together on the moving element (1) to define its angular position about the predetermined axis (X) and also its distance (D) relative to a rotional axis (W) passing through the two connecting rod ends that are connected to the respective mover means (V); and the third drive mechanism (C) is mounted on the base (2) so as to be free to rotate about an axis that is substantially parallel to the predetermined axis (X); and, away from the above-mentioned plane extending transversely to the predetermined axis (X), and is supported by the base (2) on a pivot axis (H) substantially perpendicular to the above-mentioned predetermined axis (X) being functionally active to adjust the distance between the moving element (1) and the pivot axis (H) to maintain the radial orientation (Y) of the moving element (1) relative to the predetermined axis (X);

wherein the position and the orientation of the object depend on the positions of the three above-mentioned mechanisms (A, B, C).

2. A manipulator device according to claim 1, characterized in that each mover means (V) comprises a substantially radial arm (6) for pivoting under the action of motor means on the base (2) about an axis substantially parallel to said predetermined axis (X).

3. A manipulator device according to claim 1, characterized in that the third drive mechanism (C) comprises: an arm (16) extending approximately in a plane defined by the predetermined axis (X) and an axis defined by the radial orientation (Y) and supported by the base (2) so as to be free to rotate about an axis substantially parallel to the above-mentioned predetermined axis (X), said arm being for pivoting under the action of mover means in the above-mentioned plane relative to the base about an axis (H) substantially perpendicular to the predetermined axis (X); and a connecting rod (18) interposed between the free end of the arm (16) and the moving element (1), the connecting rod (18) being connected thereto so as to be free to rotate by means of respective pins (19, 20) that are substantially parallel to each other and substantially perpendicular to the predetermined axis (X).

4. A manipulator device according to claim 1, characterized in that the first and second drive mechanisms (A, B) are pivotally mounted on the base (2) to pivot about a common axis which coincides with the predetermined axis (X), and in that the third drive mechanism (C) is mounted on the base (2) so as to be free to rotate about the predetermined axis (X).

5. A manipulator device according to claim 1, characterized in that the mover means (V) of the first and second drive means (A, B) respectively have their displacements synchronized when moving so that they are displaced simultaneously in the same direction or in opposite directions over equal angular distances.

6. A manipulator device according to claim 3, characterized in that the hinge means (8) and the attitude transmission member (9) of each of said first and second drive mechanisms (A, B) are structurally combined and comprise firstly two wheels (10) connected to respective opposite ends of the connecting rod (7) about axes (11) that are transverse to the rod and to the predetermined axis (X), and that are connected respectively to the arm (6) and to the moving element (1) by diametrically-extending shafts (12), and secondly a flexible link (13) wound without slip on said wheels.

7. A manipulator device according to claim 6, characterized in that the flexible link (15) is a cable secured to both wheels (10).

8. A manipulator device according to claim 1, characterized in that the base (2) is organized to be capable of being displaced linearly parallel to the predetermined axis (X).

* * * * *